United States Patent [19]

Thorpe

[11] 4,366,287
[45] Dec. 28, 1982

[54] GLASS FIBRE/SYNTHETIC RESIN PASTE OR SLURRY

[75] Inventor: David Thorpe, Blackley, England

[73] Assignee: Imperial Chemical Industries Limited, London, England

[21] Appl. No.: 258,807

[22] Filed: Apr. 29, 1981

Related U.S. Application Data

[62] Division of Ser. No. 21,427, Mar. 16, 1979, Pat. No. 4,288,563.

[30] Foreign Application Priority Data

Mar. 23, 1978 [GB] United Kingdom ............... 11674/78
Feb. 15, 1979 [GB] United Kingdom ................. 7905423

[51] Int. Cl.³ ............................................ C08G 18/30
[52] U.S. Cl. ............................... 524/871; 264/176 F;
428/375; 428/378; 428/403; 428/407;
428/423.1; 428/475.2; 523/205; 528/48;
65/3.43
[58] Field of Search .......... 65/3 C; 260/37 R, 37 EP,
260/37 N; 264/176 F; 428/304, 423.1, 475.2,
480, 403, 407, 375, 378; 528/48; 523/205;
524/871

[56] References Cited

U.S. PATENT DOCUMENTS

| | | | |
|---|---|---|---|
| 3,458,138 | 7/1969 | Yankee | 239/428 |
| 3,749,638 | 7/1973 | Renaud | 162/145 |
| 3,829,016 | 8/1974 | Scharfenberger | 239/127 |
| 3,864,155 | 2/1975 | Graham | 428/378 |
| 3,936,285 | 2/1976 | Maaghul | 428/378 |
| 4,006,272 | 2/1977 | Sakaguchi | 428/268 |
| 4,038,243 | 7/1977 | Maaghul | 523/203 |
| 4,073,840 | 2/1978 | Saidla | 521/51 |
| 4,148,854 | 4/1979 | Cordts et al. | 521/122 |
| 4,160,073 | 7/1979 | Lloyd-Lucas et al. | 521/122 |

FOREIGN PATENT DOCUMENTS

| | | |
|---|---|---|
| 1026499 | 4/1966 | United Kingdom . |
| 1159230 | 7/1969 | United Kingdom . |
| 1245216 | 9/1971 | United Kingdom . |
| 1310166 | 3/1973 | United Kingdom . |
| 1343356 | 1/1974 | United Kingdom . |
| 1381863 | 1/1975 | United Kingdom . |
| 1392175 | 12/1976 | United Kingdom . |
| 1458177 | 12/1976 | United Kingdom . |
| 1463769 | 2/1977 | United Kingdom . |

OTHER PUBLICATIONS

The Manufacturing Technology of Continuous Glass Fibres, Loewenstein, Elserier, Amsterdam (1973), pp. 19, 192, 198, 211-214, 217-224 and 228.

Primary Examiner—H. S. Cockeram
Attorney, Agent, or Firm—Cushman, Darby & Cushman

[57] ABSTRACT

The process comprises mixing chopped glass fibres with plastics-forming ingredients and moulding or forming the mixture to obtain reinforced plastics articles. The invention lies in the use of chopped glass fibres in filamentary form. Conveniently the glass fibres are first made into a slurry or paste, which forms the aspect of the invention, with a liquid compatible with the plastics-forming ingredients or with all or a part of one or more of the ingredients. The invention includes a novel form of chopped glass fibres formed from glass strand bound with a size containing as the main ingredient one component of a plastics-forming mixture or a derivative thereof. It also includes apparatus for mixing the glass fibre paste or slurry with plastics-forming ingredients by impingement mixing.

The invention is of special use for reinforcing with glass fibres plastics articles, especially polyurethane plastics articles, formed by a Reaction Injection Moulding (RIM) process.

4 Claims, 5 Drawing Figures

GLASS FIBRE/SYNTHETIC RESIN PASTE OR SLURRY

This is a division of application Ser. No. 021,427 filed Mar. 16, 1979 now U.S. Pat. No. 4,288,563.

This invention relates to a process for the manufacture of plastics articles containing glass fibres, to the articles so produced and to apparatus for carrying out the process. The invention also relates to a glass fibre paste or slurry for use in the process and to a novel form of glass fibre.

At the present time there is much interest in processes for the manufacture of plastics articles reinforced with glass fibres and, in particular, processes which comprise dispensing into a mould or between mould surfaces or onto a former a mixture of reactive plastics-forming ingredients obtained by mixing by impingement the liquid ingredients. One such process is the "reaction injection moulding" (RIM) process used for the manufacture of car parts, such as fascia panels and other internal and external car fitments, made from polyurethanes and polyester and epoxy resins. The RIM process is well known and documented and equipment is commercially available for its use.

Although glass fibres, in most forms, are readily incorporated into plastics-forming ingredients which are mixed using low pressure mechanical mixing equipment, this is not so where impingement mixing is used. Because the ingredients are necessarily injected at high velocity through restricted nozzles into the mixing head to ensure good impingement mixing, the length and diameter of the fibres and their "loading", that is the quantity of fibres suspended in the ingredients, is limited. In practice, conventional chopped strand fibres have not been found suitable so milled fibres are used instead.

Chopped strand fibres are the fibres produced by chopping into desired lengths strands of glass filaments which are adhered together with a binder or size. It is necessary to gather, usually a few hundred, of these filaments into cohesive strands since the glass filaments are too fine to chop individually. Thus chopped strands are small bundles of perhaps 100 to 1600 short filaments. The binder, commonly known as a 'film-former', is often polyvinyl acetate.

Milled fibres are the fibres produced when glass fibre strands are 'hammer-milled' instead of chopped. The hammer milling process breaks down the strands into individual filaments of differing lengths. Their average length is normally less than 1 mm and often as low as 0.1 mm. They differ from very short chopped fibres in that the filaments in a bundle of chopped fibres are substantially all of the same length. Milled fibres are more expensive to produce than chopped strand fibres and their manufacture less attractive because of the nuisance caused by a significant amount of fine glass dust produced during milling.

For these reasons and because longer fibres tend to provide better reinforcement, a method by which chopped strand fibres can be incorporated into plastics articles and especially urethane plastics articles, using impingement mixing is much sought after.

According to the present invention we provide a process for the manufacture of glass fibre-reinforced plastics articles, especially those made using impingement mixing of the plastics-forming ingredients, which comprises mixing together liquid plastics-forming ingredients and chopped glass fibres in filamentary form, introducing the mixture so obtained into a mould or between mould surfaces or onto a former and allowing the mixture to react and set. The invention also includes the articles so produced. While the process of the invention is of particular value in the manufacture of plastics articles made using impingement mixing techniques, we have also found that plastics articles made by other methods show improved physical properties when reinforced with chopped glass fibres in filamentary form rather than with non-filamentised glass fibres.

The types of plastics which can be used to make the articles of the invention include epoxy and unsaturated polyester resins, phenolic foams and urethane plastics. The ingredients from which they are formed are well known to the skilled worker in the relevant plastics field. Of especial interest to us are urethane plastics formed from a polyisocyanate and a polyol. These vary in type depending inter alia on the particular polyisocyanate and polyol chosen and the relative quantities used and other ingredients present which may include "chain-extenders", "cross-linking agents" and "blowing agents" to produce foamed materials. Water may be used as a blowing agent. This reacts with the polyisocyanate to form a polyurea and carbon dioxide which "blows" the plastics material into a foam. Thus the term urethane plastics materials, as it is hereinafter used, is taken to include materials which contain a substantial proportion of polyurea groups, as well as urethane groups, and also isocyanurate groups formed by trimerisation of the polyisocyanate with a suitable catalyst.

Conveniently the glass fibres are mixed with the plastics-forming ingredients as a paste or slurry supported in a liquid compatible with the plastics-forming ingredients or in all or in part of one or more of the liquid ingredients. By a liquid compatible with the plastics-forming ingredients we mean any liquid which can be mixed with the plastics-forming ingredients and which allows the ingredients to react and set to form a plastics article while remaining dispersed in the ingredients. It may be a liquid inert to the plastics-forming ingredients, such as a silicone.

Alternatively the paste or slurry is formed from a liquid which itself forms part of the plastics-forming ingredients. For example, in the case of a polyester resin, all or part of the polyester component may be used to form the paste or slurry. With an epoxy resin, the polyepoxide component may be used and with a phenol-formaldehyde resin the resole component may be used.

In the case of polyurethanes, all or part of the polyol is conveniently used but the isocyanate component may be used and it is also envisaged that the chopped fibre glass may be supported in both components. The polyol or polyisocyanate from which the paste or slurry is formed may be the same or different from the rest of the polyol or polyisocyanate used.

Chopped glass fibres may be obtained in filamentary form by, for example, shaking them in caustic soda solution until they swell and separate into individual filaments. More conveniently, however, we have found that chopped glass strands can be filamentised in the making of the paste or slurry. By "filamentised" we mean the bundles of fibres which constitute the chopped strands are separated substantially into their individual filaments.

The ease with which the fibres can be filamentised will depend, inter alia, on the size or 'film-former' used to bind the strands. Ideally its adhesive qualities will be sufficient only to prevent the strands separating into their component filaments prior to mixing into the paste or slurry, but must obviously be sufficiently effective to prevent filamentisation during the chopping process. Good filamentisation is achieved when the 'film-former' which binds the filaments is soluble in the paste or slurry medium so that the filaments are efficiently 'wetted-out'. In one embodiment the 'film-former' consists substantially of the liquid used as the paste or slurry medium or a derivative thereof.

Thus in a further aspect of our invention we provide a novel form of chopped fibre glass made by forming into strands filamentary glass which has been coated with a size containing, as the main ingredient, one component of a plastics-forming mixture, or a derivative thereof, and chopping the strands into short lengths.

For urethane plastics articles, we have found that good results are achieved when the liquid for making the paste or slurry is a polyol, especially a high molecular weight polyol (M.W. 200–6000), and when the size used in making the chopped strands contains a polyol or polyol derivative as the main binder ingredient. In this case, the liquid used to make the paste or slurry will preferably be a polyol which is the same as that from which the size is derived or a polyol having chemically similar component groups. In particular we would mention polyether polyols, especially polyalkylene oxide polyols of molecular weight of from 200 to 6000, but other polyols, for example polyester polyols of molecular weight of from 200 to 3000, may also be used.

Depending on the length and thickness of the filamentary fibres, the fibre glass or slurry will normally have a loading of up to 75%; that is it will contain up to 75% by weight of glass fibre on the combined weight of the glass fibre and liquid medium. At a loading of 80%, fibres approximately 3 mm long and 15$\mu$ thick will give an unworkable paste in a polyol used for microcellular elastomers. At 40%, the paste has a "toothpaste" consistency which retains this consistency on extrusion from a nozzle. At 50% and higher loadings the "toothpaste" consistency tends not to be retained on extrusion. In one particular embodiment of the process of the invention there is used a fibre glass paste in which the amount of liquid present is such that it does not separate from the paste to form a discrete layer. These pastes preferably have a loading of 40 to 50%. At 10% loading the liquid medium usually separates from the paste so that at lower loadings slurries will be obtained. Typical slurries of 1.5 mm long fibres will have a loading of 5 to 20%.

The filamentary glass fibres which may be used will normally be between 0.5 and 100 mm in length. Particularly useful are those in the range of 1.5 to 3 mm in length. Fibres of mixed lengths may also be used. The filamentary fibre thickness will normally be in the range of from 5 to 25$\mu$ and is preferably in the range of from 13 to 17$\mu$.

Other particulate filler materials may be added to the fibre paste. In particular we would mention inorganic powdered materials such as chalk.

Thick pastes are conveniently prepared by mixing the fibres and liquid in a 'dough mixer'. Thinner pastes and slurries can be prepared using conventional paddle stirrers.

The paste or slurry can then be mixed with the other plastics-forming ingredients and the mixture so obtained injected into the mould. It is also envisaged that the mixture can be dispensed, utilising impingement mixing techniques, between mould surfaces in the manufacture, continuous or otherwise, of, for example foam panels and particularly urethane foam panels, especially those having a high isocyanurate content. Such panels are of especial interest in the building industry for insulation purposes. In addition to reinforcing the foam, the glass fibres help to make the foam more fire resistant.

It may be possible to use conventional RIM process machinery for mixing and dispensing the plastics-forming mixture but this will depend inter alia on the loading of the plaste or slurry, the length of fibres and the overall viscosity. As a guide, a slurry of up to 5% loading of 3 mm filamentary chopped fibre in a polyol suitable for microcellular elastomers can be dispensed in conventional equipment as can similar slurries of up to 12% loading of 1.5 mm filamentary chopped fibre and possibly up to 2% loading of 6 mm chopped fibre. Conveniently the apparatus hereinafter described, which is a mixing and dispensing gun and which also forms part of the present invention, can be used.

Thus according to yet a further aspect of our invention we provide apparatus for mixing and dispensing liquid material and a paste or slurry of fibrous or other particulate filler material, which comprises a mixing chamber having an outlet, an inlet constructed for the supply at low velocity to the chamber of paste or slurry, and one or more inlets constructed for the supply at high velocity to the chamber of liquid material; the inlets being arranged to enable the liquid material to impinge on the paste or slurry to effect mixing.

To obtain good mixing of plastics-forming ingredients, it is necessary that the liquid material impinges on the paste or slurry at high velocity to create high turbulence in the mixing chamber. The liquid will need to be fed to the chamber under high pressure, the exact pressure depending, inter alia, on the viscosity of the liquid material. The high velocity inlet or inlets will be sized according to the pressure and quantity of material to be delivered.

Because of the higher viscosity of the paste or slurry, relatively high pressures will be needed to obtain low velocity flow into the mixing chamber. Here too, the low velocity inlet will be sized according to the pressure and quantity of paste to be delivered.

Suitably, the outlet is positioned at a forward end of the chamber, the low velocity inlet at a rearward end and the high velocity inlet or inlets intermediate the forward and rearward ends. Normally there will be two high velocity inlets, and preferably two pairs of such inlets, diametrally opposed and directed substantially at right angles to the line of flow of paste or slurry from the low velocity inlet to the outlet.

The low velocity inlet may be shaped in a particular way to suit the desired distribution of the paste or slurry in the mixing chamber. For example, it may be shaped to give a ribbon of paste or it may take the form of an annular opening around the circumference of the chamber.

In a preferred embodiment there is provided a plunger whose forward end is reciprocable within the chamber between an open position rearward of the high velocity inlet or inlets and a closed position forward of the high velocity inlet or inlets and a passage in the plunger which communicates with the chamber when the plunger is in the open position and which forms the low velocity inlet.

To prevent clogging of the chamber by material left after a dispensing operation, the forward end of the plunger is preferably made flush with the outlet end of the chamber when in the closed position.

The plunger can be reciprocated within the chamber by any suitable means. Conveniently, however, its rearward end is attached to a piston which itself is reciprocable in a cylinder and which, in turn, reciprocates the plunger. The piston may be operated hydraulically or by gaseous pressure.

The low velocity inlet is connectable to a device for supplying the paste or slurry of fibrous or other particulate filler material. One such device comprises a paste pumping cylinder and a paste pumping piston reciprocable within the cylinder, the cylinder having an outlet for connection with the low velocity inlet of the mixing and dispensing apparatus and an inlet for the supply of paste.

The paste pumping piston is preferably operated hydraulically or mechanically. Better control over the output rate of the paste pump is obtained using mechanical means, for example, an electric motor and crank mechanism.

The apparatus of the present invention will now be further described by way of example, with reference to the accompanying drawings in which.

Figure 1:
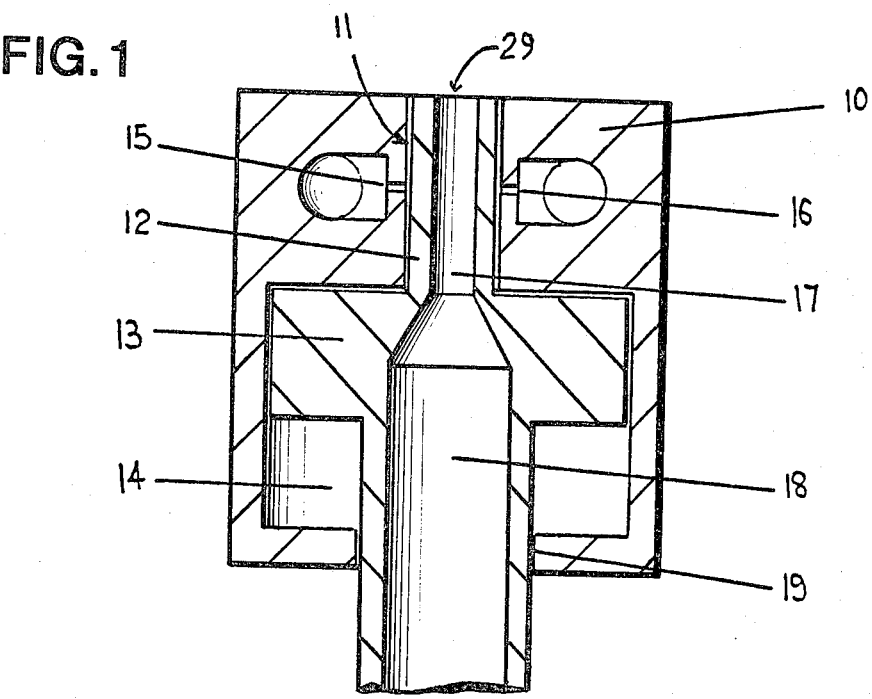
FIG. 1 is a diametral elevational section through part of a mixing and dispensing gun in a closed position.
Figure 2:
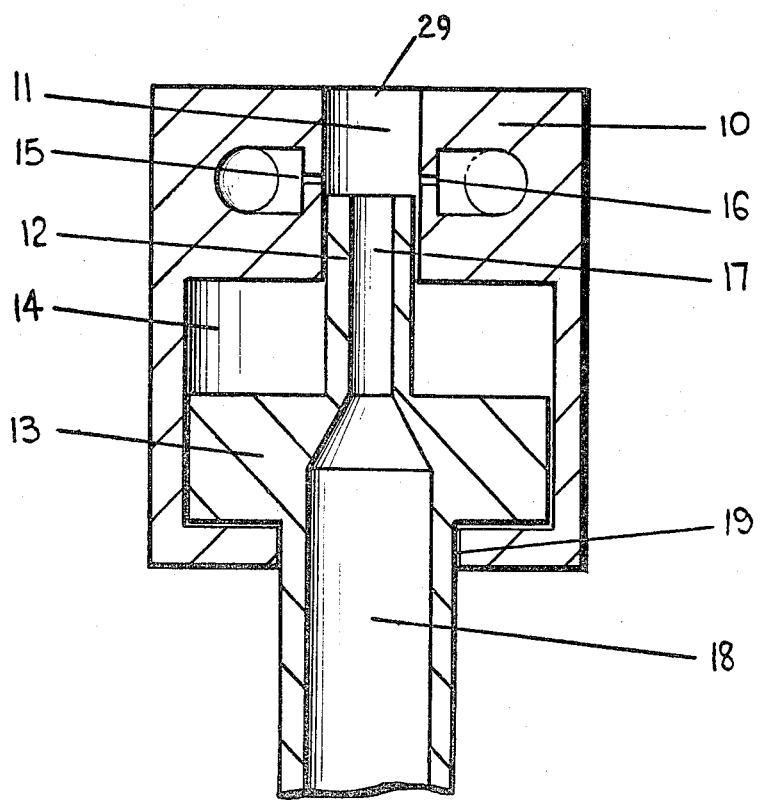
FIG. 2 is the same section as FIG. 1 except that the gun is in an open position.

In FIGS. 1 and 2, a gun 10 comprises a chamber 11 having an outlet 29, and a plunger 12, within said chamber, which is attached to a piston 13 housed in a cylinder 14. The plunger 12 is shown in a closed position in FIG. 1 and in an open position in FIG. 2. The cylinder 14 is connectable to a supply of hydraulic liquid (not shown) to which pressure can be applied. A seal 19 prevents hydraulic liquid escaping between the piston 13 and cylinder 14. High velocity inlets 15 and 16 provide means by which liquid ingredients can be supplied to the chamber 11. A passage 17, which forms a low velocity inlet in the plunger 12 extends through to the piston 13 into a duct 18 of a larger bore and is connectable to a device (not shown in FIG. 1) for supplying fibrous or other particulate material to the chamber.

Figure 3:
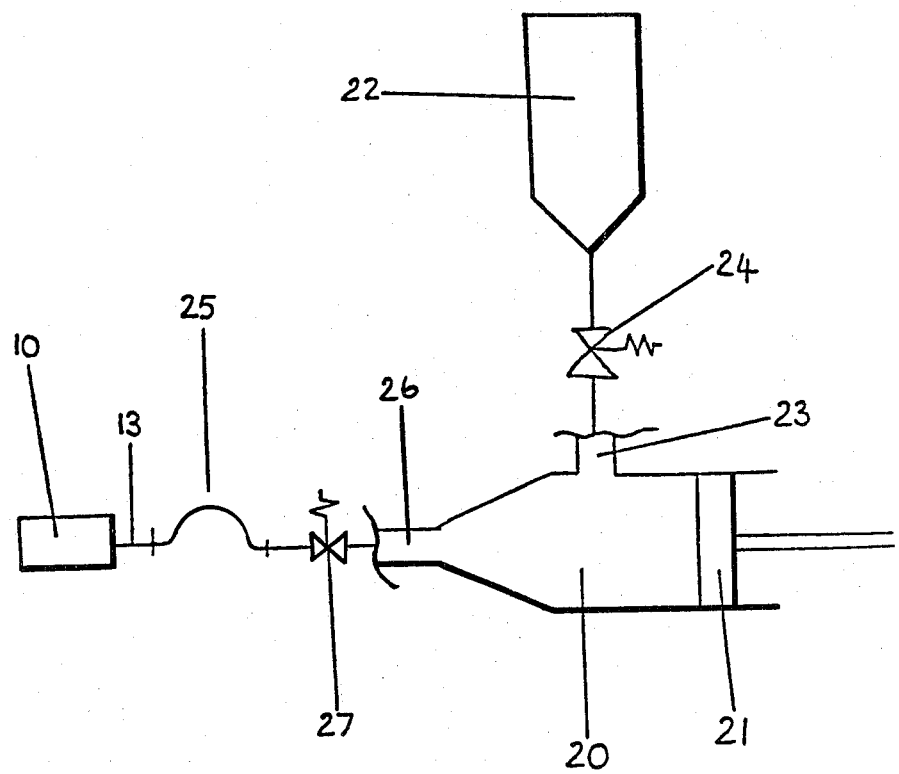
FIG. 3 is a diagrammatic view of the gun shown in FIGS. 1 and 2 connected to a device for supplying to the gun a paste of fibrous and other particulate material.

In FIG. 3, a device for supplying a paste or slurry of fibrous and other particulate material to gun 10 comprises a paste pumping cylinder 20, a paste pumping piston 21 operated within cylinder 20 by a hydraulic device (not shown), a paste feed tank 22 connected to cylinder 20 at inlet 23 via a valve 24 and a short flexible hose 25 which connects cylinder 20 at outlet 26 through valve 27 to the passage (not shown) in the piston 13 of gun 10.

The operation of this apparatus will now be described in relation to the mixing and dispensing of urethane plastics-forming ingredients but it will be understood that it can similarly be used with other plastics-forming ingredients.

In one method of using the apparatus with urethane plastics-forming ingredients, polyol and polyisocyanate components are circulated at high pressure through a recirculation system provided in the gun (not shown) while the plunger is in the closed position. At this stage valves 24 and 27 will be closed and during normal operation the line from the paste pumping cylinder 20 through to the forward end of the passage 17 in the plunger 12 will be full of paste.

When it is desired to mix the urethane plastics-forming ingredients and paste and to inject the mixture so formed into the mould, the outlet of the chamber 11 is positioned at the mould opening and the plunger is moved to the open position by the hydraulically operated piston 13 actuated by a trigger (not shown). High velocity inlets 15 and 16, for the polyol and polyisocyanate respectively, are opened, and the re-circulation systems closed so that streams of these ingredients are injected under high pressure at high velocity into the chamber 11. In synchronisation with the retraction of the plunger to the open position and the opening of inlets 15 and 16, valve 27 is opened and paste pumping piston 21 is actuated to force paste from the pumping cylinder 20, which has previously been primed with paste from the feed tank 22, into the mixing chamber at low velocity. The polyol and polyisocyanate streams impinge on the paste in the mixing chamber wherein the three ingredients are intimately mixed. After a predetermined amount of the mixed ingredients has been dispensed from the gun, the trigger is released and the plunger is moved forward to the closed position to cut off supplies of the polyol and polyisocyanate to the chamber 11. As the plunger moves forward valve 27 closes to stop the paste flow. Valve 27 is so positioned and operated that there is a slight exudation of paste from the forward end of the plunger when it has reached the closed position. This purges the chamber and keeps the forward end of the plunger clear of the urethane plastics forming ingredients at the end of each dispensing operation.

When the mixture has been dispensed, the paste pumping cylinder is automatically recharged. Thus valve 24 opens and the paste pumping piston 21 returns slowly to its starting position drawing in paste from the feed tank. Valve 24 then closes and the device is ready for the next operation.

A screw type pump may be used as an alternative to the cylinder 20 and piston 21 of FIG. 3. In this case, valves 24 and 27 are omitted and the screw pump is started to introduce the paste into the mixing chamber as the plunger 12 is withdrawn. At the end of the shot the screw pump preferentially continues to operate for a brief period in order to obtain the small exudation of paste from the forward end of the plunger in the closed position.

Guns for injecting urethane plastics-forming ingredients which have a recirculation facility for the polyol and polyisocyanate components and a hydraulically operated plunger are well known and mechanical features used on those guns may be adopted for use on the apparatus of the present invention.

Figure 4:
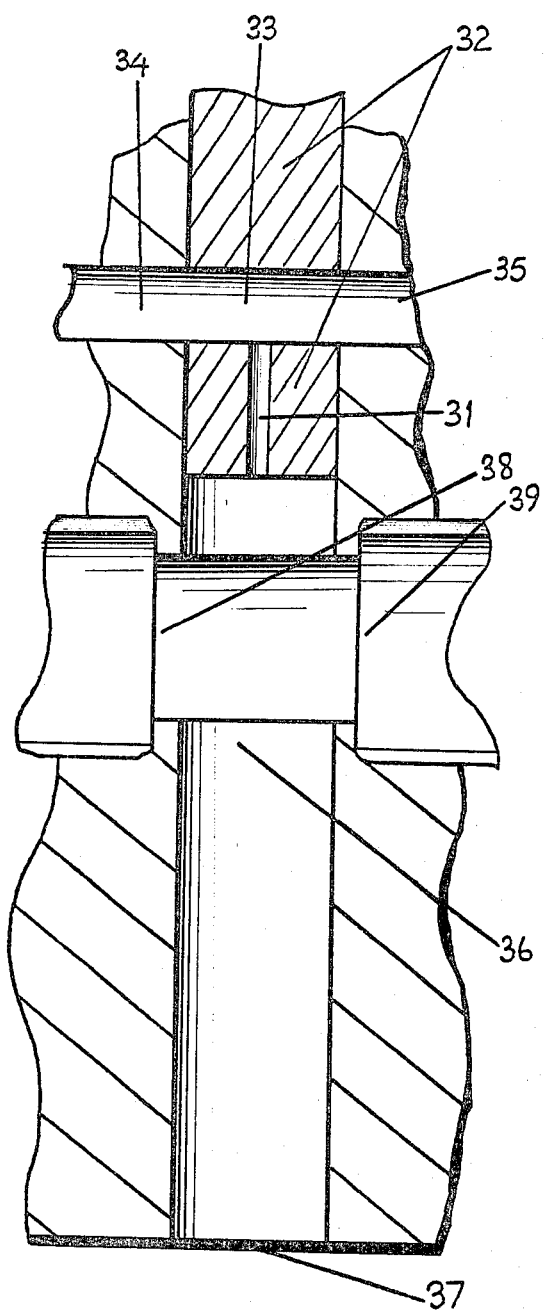
FIGS. 4 and 5 are diametral elevational sections through different mixing and dispensing guns.
Figure 5:
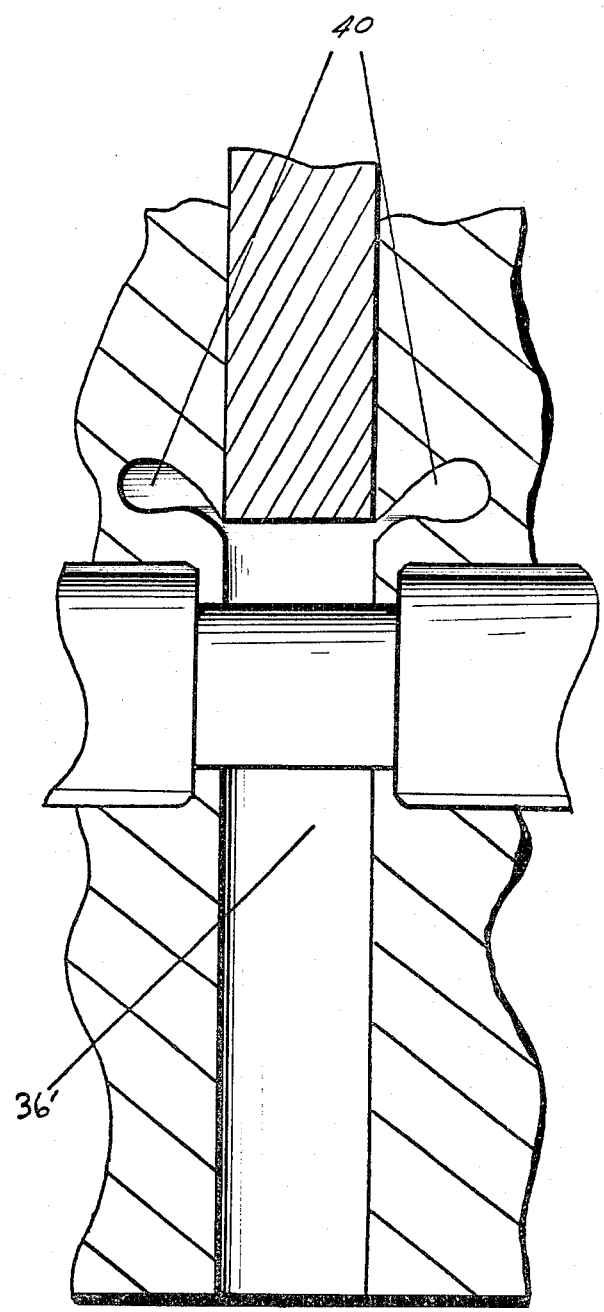

Modifications of the apparatus are shown in FIGS. 4 and 5.

In FIG. 4, a mixing chamber 36 has an outlet 37 and diametrally opposed high velocity inlets 38 and 39. Low velocity inlet 31 in plunger 32 is ribbon-shaped in cross section (one edge of the 'ribbon' is shown) and communicates with a diametral passage 33. In the open position, passage 33 registers with ducts 34 and 35 connectable to a device for supplying the paste or slurry.

In FIG. 5, a low velocity inlet 40 comprises an annular opening around the rearward end of chamber $36^1$ and communicates with a supply passage (not shown).

It is not necessary that the isocyanate and polyol components are each injected through one of the high velocity inlets as described. It is possible, for instance, to inject all of the polyol or all of the isocyanate as a slurry with the fibrous material and to inject two streams of the other reactive ingredient from the twin high velocity inlets. It will be evident from this that other variations are also possible.

Other features of known mixing and dispensing equipment may be adapted for use with the apparatus of the present invention. For example, the outlet 29 (FIGS. 1 and 2) or 37 (FIG. 4) may be connected to a second, larger bore mixing chamber, the direction of flow through which is inclined, preferably at 90°, to that from the first into the second chamber. This feature of a second mixing chamber is described in UK Patent Specification No. 1,501,814. Such a device facilitates mixing of a volatile foaming agent with the plastics-forming ingredients at the lower pressure of the second chamber. Also, a plunger in the second chamber can usefully be employed to remove reactive ingredients from the end of the plunger in the first mixing chamber at the end of a shot.

Other ingredients may be introduced with the isocyanate or polyol or through a separate inlet into the mixing chamber.

Preferably the gun is mounted on the mould and the paste feed device kept as close as possible to keep the pressure drop to a minimum. For the same reason, the bore of the duct 18 is as large as is practical and the relatively small bore of passage 17 as short as possible.

A typical output rate for urethane plastics-forming ingredients is 100 kg/min. The amount of paste required to incorporate 10% by weight of fibres and other filler material (dry weight) on the weight of plastics-forming ingredients will be about 13.5 kg/min allowing for the liquid present. If the paste density is about 2.2 gm/cm$^3$, then for a 6 mm diameter passage in the plunger, the output velocity required is 360 cm/sec and for a 1 cm diameter passage, 130 cm/sec.

Ideally, the diameter of the passage 17 is the same as the mean fibre length or greater. It is unlikely that good results will be obtained if the diameter is less than one tenth the mean length of the fibre. On the other hand, the bore should not be so wide that inefficient impingement mixing of the polyol and isocyanate results.

The method and apparatus of the invention may be used for making plastics articles in a batch moulding process or may be adapted for continuous or semi-continuous moulding, for instance, in continuous lamination processes and in particular in the continuous lamination of rigid urethane foam products with paper and rigid facings. In a continuous process a self-cleaning facility on the gun would not be necessary as the paste feed would be continuous. The paste could be supplied continuously by a double acting pump or two linked single acting pumps working in opposite phases. Of course, these could also be used where a single large 'shot' of the foam-forming ingredients is required.

The invention is further illustrated by the following examples in which parts and percentages are by weight unless otherwise stated.

EXAMPLE 1

A 40% paste was prepared by mixing together in a dough mixer 40 parts of chopped fibre glass strands (mean length 3 mm) bound with a size containing, as the main ingredient, a polyol derivative and chopped from fibre glass roving obtainable from Fibreglass Limited, Reinforcements Division, St. Helens, Merseyside, UK under the name WX 6012 Experimental Roving, and 60 parts of a polyether triol which is a 15% ethylene oxide tipped oxypropylated glycerol (MW approximately 5300:OH value 32 mg KOH/g:75% primary OH groups).

The paste was extruded through an 8 mm long tube having an internal diameter of 3.5 mm under pressure. The paste extruded rapidly retaining a "toothpaste" consistency.

EXAMPLE 2

The procedure of Example 1 was repeated except that only 40 parts of the polyol were used to give a paste loading of 50%. Again the paste extruded rapidly but did not retain its "toothpaste" consistency.

EXAMPLE 3

The procedure of Example 1 was repeated except that only 13.3 parts of the polyol were used to give a paste loading of 75%. The paste extruded rapidly but did not retain its paste-like form.

COMPARATIVE EXPERIMENTS

The procedure of Example 1 was repeated except that no polyol was used. The dry fibre could not be extruded even through a 5 mm bore tube. The fibre when mixed with 10% polyol could not be extruded through the 3 mm or 5 mm bore tube.

EXAMPLE 4

Polyurethane Microcellular Elastomer (i) Comparative control: no fibreglass

A polyol blend, prepared by stirring together the ingredients listed below was mixed for 5 seconds with 101.7 parts of an MDI (diphenylmethane diisocyanate) blend of NCO value 26%. The reacting mixture was rapidly poured into an open metal mould (dimensions 20 cm × 10 cm × 3 mm) preheated to 50° C. and the mould was sealed. After 5 minutes, the moulded microcellular elastomer so obtained was removed from the mould. After ageing for 48 hours physical tests were carried out and the results are shown in Table 1.

| Polyol Blend | parts |
| --- | --- |
| Polyol (ethylene oxide tipped propylene-oxide Diol/Triol Mix) OHV 30 | 100 |
| 1,4,Butane Diol | 25 |
| DABCO 33 LV (T.M.) | 0.7 |
| Dibutyl Tin Dilaurate | 0.05 |
| Water | 0.12 |

(ii) Comparative Experiment: non Filamentised Glass

The procedure of Example 4(i) was repeated except that 5 parts of 3 mm chopped glass strand (FS 52 ex Scandinavian Glass Fibre Ltd) were premixed into the polyol blend prior to mixing with the isocyanate. The glass fibre was clearly visible in the polyol mixture as cohesive strands and little effect on viscosity of the addition was noted.

Physical test results are shown in Table 1.

(iii) Filamentised Chopped Glass

The chopped glass fibre strand of Example 4(ii) was treated in the following manner to break down the strands into individual filaments.

The chopped strands (25 gm) were shaken in 200 ml of a solution of 5% caustic soda in water. The fibre bundles immediately swelled and separated into individual filaments. The very viscous slurry was then allowed to stand for 3 days, after which time the 3 mm filaments were filtered off, washed alkali free with water and finally washed with acetone and dried at 80° C. for 2 hours.

This dried, filamentised glass fibre was used to prepare a microcellular polymethane elastomer by the procedure of Example 4(i) but adding 2.5 parts of the pretreated fibre to the polyol blend.

It was found impracticable to add any more than this because of the large increase in viscosity caused by the filamentised glass.

Physical test results are shown in Table 1.

TABLE 1

|  | Example No. | | |
| --- | --- | --- | --- |
|  | 4(i) | 4(ii) | 4(iii) |
| Glass Content (% w/w overall) | 0 | 2.2 | 1.1 |
| Glass Type | — | 3mm Strand | 3mm Filament |
| Density (Kg m$^{-3}$) | 930 | 925 | 907 |
| Hardness (Shore D) | 47 | 49 | 53 |
| Tensile Strength (KN m$^{-2}$) | 12,500 | 9,700 | 12,100 |
| Elongation at Break | 160 | 75 | 105 |
| Flexural Modulus (MPa) | 214 | 224 | 266 |
| Sag Test (120° C., 30 min, 100mm Overhang) | 35.6mm | 27.9mm | 15.2mm |
| Coefficient of Linear Thermal Expansion (°K.$^{-1}$) | 1.3 × 10$^{-4}$ | 1.02 × 10$^{-4}$ | 0.82 × 10$^{-4}$ |

NB. In the microcellular elastomer of Example 4(ii) the fibre strands were visible in the moulded surface and in the broken ends of the tensile strength test pieces. No fibres were visible to the naked eye in Example 4(iii).

EXAMPLE 5

Polyurethane Microcellular Elastomer (i) Comparative Experiment: Hammer-Milled Glass The procedure of Example 4(i) was repeated using 20 parts of hammer-milled glass (Type 731 CA 1/16" ex. Owens Corning Fibreglass Ltd) premixed into the polyol blend. Results are shown in Table 2.

(ii) Comparative Experiment: Hammer-Milled Glass (High Level)

The procedure of Example 5(i) was repeated but using 60 parts of the hammer-milled glass. Results are shown in Table 2. The microcellular elastomer had a very porous surface.

(iii) 1.5 mm chopped, filamentised glass

The procedure of Example 4(i) was repeated but incorporating 20 parts of a 1.5 mm chopped glass strand (chopped from Type WX 6012 Experimental Strand ex Fibreglass UK Ltd). The fibre filamentised rapidly on stirring into the polyol blend. No visible sign of the fibres could be observed in the resultant microcellular elastomer. Results are shown in Table 2.

TABLE 2

|  | Example No. | | |
| --- | --- | --- | --- |
|  | 5(i) | 5(ii) | 5(iii) |
| Glass Content (% w/w overall) | 8.1 | 21 | 8.1 |
| Glass Type | hammer-milled | hammer-milled | 1.5mm Chopped filament |
| Density (Kg m$^{-3}$) | 900 | 970 | 860 |
| Hardness (Shore D) | 53 | 57 | 50 |
| Tensile Strength (KN m$^{-2}$) | 10,300 | 12,500 | 18,100 |
| Elongation at Break (%) | 70 | 30 | 10 |
| Flexural Modulus (MPa) | 440 | 750 | 690 |
| Sag Test (120° C., 30 min 100mm overhang) | 2.5mm | 2.5mm | 1.3mm |
| Coefficient of Linear Thermal Expansion | 0.82 | 0.30 | 0.42 |

EXAMPLE 6

Polyurethane Microcellular Elastomer (i) Comparative Control: no fibreglass

Using a Krauss Maffei 40/80 RIM machine equipped with piston dosing system on the polyol side, and a temperature controlled (50° C.) mould of dimensions 1 meter × 30 cm × 4 mm, test sheets were made from the following formulation:

|  | parts |
| --- | --- |
| Polyether triol used in Ex. 1 | 100 |
| Ethylene Glycol | 21 |
| DABCO (T.M.) | 0.7 |
| Dibutyl Tin Dilaurate | 0.1 |
| MDI blend used in Ex. 4(i) | 121 |

The physical properties are shown in Table 3.

(ii) Comparative Experiment: Hammer-Milled Glass

The procedure of Example 6(i) was repeated but incorporating 63.5 parts of hammer-milled glass (Type 731CA ex Owens Corning Fiberglass Ltd) into the polyol blend. Test results are shown in Table 3.

(iii) Filamentised Glass

The procedure of Example 6(ii) was repeated but incorporating 13.3 parts of 1.5 mm chopped fibreglass strand (Type WX 6012 ex Fibreglass UK Ltd). The fibreglass filamentised on stirring into the polyol blend. Physical test results are shown in Table 3.

Microscopic examination showed no unfilamentised bundles.

TABLE 3

|  | Example No. | | |
| --- | --- | --- | --- |
|  | 6(i) | 6(ii) | 6(iii) |
| Glass Content (% w/w overall) | 0 | 20 | 5 |
| Glass Type | — | H.M. | 1.5 Chopped Filament |
| Density (Kg m$^{-3}$) | 1170 | 1020 | 1020 |
| Hardness (Shore D) | 61 | 55 | 60 |
| Tensile Strength (KNm$^{-2}$) | 23600 | 12800 | 19000 |
| Elongation at Break (%) | 115 | 30 | 35 |
| Flexural Modulus (MPa) | 310 | 560 | 650 |
| Sag. Test. (120° C., 60 min, 100 mm overhang) | 9.1mm | 1.3mm | 0 |
| Coefficient of Linear Thermal Expansion (°K.$^{-1}$) | 130 × 10$^{-6}$ | 33 × 10$^{-6}$ | 35 × 10$^{-6}$ |

EXAMPLE 7

Structural (High Density Rigid) Polyurethane Foams (i) Comparative control: no fibreglass A polyol blend prepared by stirring together the ingredients listed below was mixed with 135 parts of a low functionality polymeric MDI and poured into a metal mould (30 cm×15 cm×1.25 cm) heated to 55° C. to produce a structural foam test piece. After allowing 48 hrs for completion of curing the sample was tested. The test results are given in Table 4.

| Polyol Blend | parts |
| --- | --- |
| Oxypropylated trimethylol propane (OH value 540 mg kOH/g) | 70 |
| Oxypropylated trimethylol propane (OH value 360 mg kOH/g) | 30 |
| Silicone L 5420 (ex Union Carbide) | 0.5 |
| Salicylic Acid | 0.75 |
| N,N—dimethylcyclohexylamine | 2.7 |
| Water | 0.25 |
| "Arcton" 11 (RTM) | 4 |

(ii) Comparative Experiment: non-Filamentised Glass

The procedure of Example 7(i) was repeated except that 12.6 parts of 3 mm chopped glass fibre FGCS 1617 (ex Fibreglass UK Ltd) were incorporated in the polyol blend prior to mixing with the isocyanate. Little increase in viscosity was noted on incorporation of the fibre and there could be clearly seen discrete bundles of fibres in the polyol blend. Test results are shown in Table 4.

(iii) Filamentised Chopped Glass

The procedure of Example 7(i) was repeated except that 12.6 parts of 3 mm chopped glass strand (chopped from WX 6012 Experimental Strand, ex Fibreglass UK Ltd.) were incorporated in the polyol blend prior to mixing with the isocyanate. Incorporation of the fibre gave a large increase in viscosity and upon microscopic examination no fibre bundles could be detected. Test results are shown in Table 4.

TABLE 4

| | Example No. | | |
| --- | --- | --- | --- |
| | 7(i) | 7(ii) | 7(iii) |
| Glass content (% w/w overall) | 0 | 8.4 | 8.4 |
| Glass Type | — | 3mm chopped strand | 3mm chopped filament |
| Density (K gm$^{-3}$) | 420 | 450 | 440 |
| Heat Distortion Temp. (ASTM D648-56) | 64 | 65 | 92 |
| Impact Strength (Falling Weight) (Joules) | 10.1 | 10.9 | 14.1 |
| Tangent Modulus of Elasticity (MPa) | 580 | 760 | 890 |
| Stress at Break (MPa) | 16.3 | 21.5 | 22.5 |
| Strain at Break (%) | 7.1 | 4.5 | 2.9 |

EXAMPLE 8

Rigid Polyurethane Foams (i) Comparative Control: no fibreglass

A polyol blend prepared by stirring together the ingredients listed below was mixed with 112 parts of polymeric MDI and poured into a square box mould (18 cm×18 cm) and allowed to form a free rise rigid foam. After allowing 48 hours for curing, the foam was sliced to obtain samples 20 mm thick from the inner part of the foam. Test pieces were then sawn from these 20 mm thick slices. Test results are shown in Table 5.

| Polyol Blend | parts |
| --- | --- |
| Oxypropylated sorbitol | 100 |
| Ethylene oxide tipped oxypropylated ethylene glycol | 5 |
| Silicone L 5420 (ex Union Carbide) | 1.5 |
| N,N—dimethylcyclohexylamine | 4 |
| "Arcton" 11 (RTM) | 40 |

(ii) Comparative Experiment: non-Filamentised Glass

The procedure of Example 8(i) was repeated except that 12 parts of 3 mm fibre glass chopped strand FGCS 1617 (ex Fibreglass UK Ltd) were incorporated into the polyol blend prior to mixing with the isocyanate. The fibres were clearly visible as discrete bundles in the polyol and no large increase in viscosity occurred. Test results are shown in Table 2.

(iii) Filamentised Chopped Glass

The procedure of Example 8(i) was repeated except that 12 parts of 3 mm fibreglass chopped strand (chopped from WX 6012 Experimental Strand, ex Fibreglass UK Ltd) were incorporated into the polyol blend. The fibre bundles dispersed readily into individual filaments and a large viscosity increase was noted. Physical test results are shown in Table 5.

TABLE 5

| | Example No. | | |
| --- | --- | --- | --- |
| | 8(i) | 8(ii) | 8(iii) |
| Glass Content (% overall) | 0 | 5 | 5 |
| Glass | — | 3mm Chopped Strand | 3mm Chopped Filaments |
| Density (kg/m$^3$) | 31.0 | 32.6 | 34.5 |
| 3 Point Load Test (I.S.O. 1209) | | | |
| Load at Break (N) | 21 | 19 | 25 |
| Deflection at Break (mm) | 12 | 12 | 11 |
| Bending Modulus (KNm$^{-2}$) | 4600 | 4500 | 6200 |

EXAMPLE 9

Epoxy Resin Casting (i) Comparative Control: no fibreglass

A bisepoxide derived from bisphenol A, Epikote* 828 (100 parts), diethylene triamine (12 parts) and γ-butyrolactam (20 parts) were mixed together in a cardboard cup using a low speed paddle stirrer. The mixture was then poured into an open metal cavity of dimensions 15 cm×15 cm×2 mm and allowed to set for 2 hours. The casting was then post-cured for 1 hour at 150° C. Test results are shown in Table 6.

*"Epikote" is a registered Trade Mark.

(ii) Comparative Experiment: Non-Filamentised Glass

The procedure of Example 9(i) was repeated except that 4 parts of 3 mm chopped glass fibre FGCS 1617 (ex Fibreglass UK Ltd.) were incorporated in the mixture. No viscosity increase was observed and the fibre bundles were clearly visible in the casting.

Test results are shown in Table 6.

(iii) Filamentised Chopped Glass

The procedure of Example 9(i) was repeated except that 4 parts of 3 mm glass strand (chopped from WX 6012 Experimental Strand, ex Fibreglass UK Ltd.) were incorporated in the mixture. A large increase in viscosity was noted and the fibres could not be distinguished in the casting. Test results are shown in Table 6.

TABLE 6

|  | Example No. | | |
| --- | --- | --- | --- |
|  | 9(i) | 9(ii) | 9(iii) |
| Glass type | — | 3mm bundles | 3mm filaments |
| Glass loading (% w/v overall) | 0 | 3 | 3 |
| Density (Kg/m$^3$) | 1060 | 1120 | 1120 |
| Hardness (Shore D) | 86 | 89 | 89 |
| Flexural Modulus (MPa) | 1070 | 2370 | 2730 |

EXAMPLE 10

Unsaturated Polyester Resin Casting

(i) Comparative Control: no fibreglass

Impolex* D1015 polyester resin (obtainable from Imperial Chemical Industries Limited, Petrochemicals Division) (100 parts) and methylethylketone peroxide (1.5 parts) were mixed in a cardboard cup with a paddle stirrer. The liquid mixture was poured into a metal cavity of dimensions 15 cm×15 cm×2 mm and allowed to set for 2 hours. The casting was then post-cured at 150° C. for 1 hour. Test results are shown in Table 7.

*"Impolex" is a registered Trade Mark.

(ii) Comparative Experiment: Unfilamentised Glass

The procedure of Example 10(i) was repeated except that 3.0 parts of 3 mm chopped glass fibre FGCS 1617 (ex Fibreglass UK Ltd.) were incorporated in the polyester resin. The chopped strands had little effect on viscosity and were clearly visible in the coating. Test results are shown in Table 7.

(iii) Filamentised Chopped Glass

The procedure of Example 10(i) was repeated except that 3.0 parts of 3 mm chopped glass strand chopped from WX 6012 (Experimental Strand, ex Fibreglass UK Ltd.) were incorporated in the polyester resin. The fibre dispersed rapidly and caused a large increase in viscosity. The fibres could not be distinguished in the casting. Test results are shown in Table 7.

TABLE 7

|  | Example No. | | |
| --- | --- | --- | --- |
|  | 10(i) | 10(ii) | 10(iii) |
| Glass type | — | 3mm strand | 3mm filament |
| Glass content (% overall) | 0 | 2.9 | 2.9 |
| Density (Kg/m$^3$) | 1216 | 1240 | 1200 |
| Flexural Modulus (MPa) | 12 | 25 | 120 |
| Tensile Strength (kN/m$^2$) | 3840 | 3840 | 7120 |

EXAMPLE 11

Polyurethane Microcellular Elastomer

(i) Comparative Control: no fibre glass

The procedure of Example 4(i) was repeated except that the moulding process was marginally altered to give an elastomer of slightly higher density. Test results are given in Table 8.

(ii) Comparative Experiment: Non-filamentised glass

The procedure of Example 11 (i) was repeated except that 6.6 parts of 3 mm chopped glass fibre FGCS 1617 (ex Fibreglass UK Ltd.) were incorporated into the polyol blend prior to mixing with the isocyanate. Test results are given in Table 8.

(iii) Filamentised Chopped Glass

The procedure of Example 11(i) was repeated except that 6.6 parts of 3 mm chopped glass strand (chopped from WX 6012 Experimental Strand, ex Fibreglass UK Ltd.) were incorporated into the polyol blend prior to mixing with the isocyanate. Test results are given in Table 8.

TABLE 8

|  | Example No. | | |
| --- | --- | --- | --- |
|  | 11(i) | 11(ii) | 11(iii) |
| Glass Type | — | 3mm | 3mm |
| Glass Concentration (% w/w overall) | 0 | 2.8 | 2.8 |
| Density (Kg/m$^3$) | 109 | 1080 | 1020 |
| Hardness (Shore D) | 61 | 59 | 60 |
| Tensile Strength (KNm$^2$) | 15,000 | 11,400 | 13,000 |
| Elongation at Break (%) | 130 | 70 | 40 |
| Flexural Modulus (MPa) | 290 | 300 | 450 |

Parts (i) and (ii) of Examples 4 to 11 are given for comparative purposes only and form no part of the present invention.

DISCUSSION OF RESULTS

From Table 1 it will be seen that the use of filamentised 3 mm chopped glass in a microcellular elastomer, in accordance with our invention, produces a product superior to that made with twice as much unfilamentised 3 mm chopped glass, particularly in respect of the important properties of tensile strength, flexural modulus, sag and linear thermal expansion. Table 8 shows that a similar elastomer reinforced with 3 mm chopped glass filamentised by a different method gives a superior product to that made with the same amount of unfilamentised 3 mm chopped glass.

From Table 2 it will be seen that the use of filamentised 1.5 mm chopped glass in the elastomer of Table 1 produces a product superior to those products made with (a) the same amount, and (b) twice the amount, of hammer-milled glass.

From Table 3 it will be seen that the use of filamentised 1.5 mm chopped glass in a different elastomer produces a product superior to that made with nearly four times as much hammer-milled glass.

Table 4 shows that filamentised 3 mm chopped glass in a structural foam gives a product superior to such foams containing non-filamentised chopped glass of the same length in respect of heat distortion, impact strength, tangent modulus of elasticity and stress and strain at break. Table 5 shows that in a rigid foam it gives a product superior in a 3-point load test.

Tables 6 and 7 show that filamentised 3 mm chopped glass in epoxy resin and unsaturated polyester resin coatings gives products of superior flexural modulus and, in the case of the polyester resin, superior tensile strength than equivalent products made with non-filamentised chopped glass.

I claim:

1. Chopped fibre glass suitable for use in making a glass fibre paste or slurry, said glass having been made by:
   (a) forming into strands filamentary glass which has been coated with a size containing, as the main ingredient, one component of a plastics forming mixture or a derivative thereof, and
   (b) chopping said strands into short lengths, the chopped fibre glass being characterized as substantially separable into individual lengths when added to a liquid medium which is compatible with plastics-forming ingredients or all or part of one or more of said plastics-forming ingredients.

2. The chopped fibre glass of claim 1 in which the said glass fibres are mixed with said plastics-forming ingredients as a paste or slurry supported in a liquid compatible with said plastics-forming ingredients or in all or in part of one or more of said liquid ingredients.

3. The chopped fibre glass of claim 2 in which said plastics-forming ingredients and said glass fibre paste or slurry are mixed by impingement mixing.

4. The chopped fibre glass of claim 1 in which said plastics-forming ingredients comprise a polyisocyanate and a polyol.

* * * * *